United States Patent [19]

Plasse

[11] 4,105,831
[45] Aug. 8, 1978

[54] VENTED FLAT BATTERY

[75] Inventor: Paul A. Plasse, Lexington, Mass.

[73] Assignee: Polaroid Corporation, Cambridge, Mass.

[21] Appl. No.: 761,649

[22] Filed: Jan. 24, 1977

[51] Int. Cl.² .......................................... H01M 2/12
[52] U.S. Cl. ...................................... 429/86; 429/162
[58] Field of Search ................................. 429/86, 162

[56] References Cited

U.S. PATENT DOCUMENTS

| 3,306,777 | 2/1967 | Reid et al. | 429/82 |
| 3,647,557 | 3/1972 | Kegelman | 429/86 |
| 3,853,629 | 12/1974 | Elliott | 429/86 |
| 3,870,566 | 3/1975 | Bergum et al. | 429/162 |

Primary Examiner—Donald L. Walton
Attorney, Agent, or Firm—John W. Ericson

[57] ABSTRACT

Cells or multicell batteries are provided with vents comprising fiber-filled plastic tubes. The plastic tube walls are formed of a hydrogen-permeable, liquid-impermeable, plastic material and the fibers which fill the interior of the tube serve to maintain an open gas diffusion passage through the tube. The vents extend through seals between battery components into electrochemically active regions of the battery, into gas permeable regions of the battery outside of the electrochemically active regions, or both. The fiber filled tube can terminate in the cell interior when the end positioned within the cell is sealed with a hydrogen-permeable, liquid-impermeable, plastic layer, or the tube can extend across the battery length or width. At least one end of the tube is open to the atmosphere.

5 Claims, 16 Drawing Figures

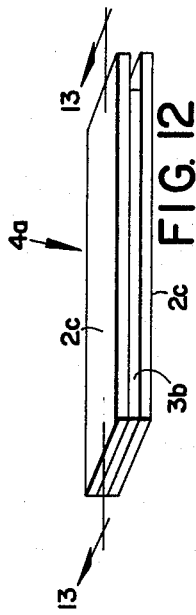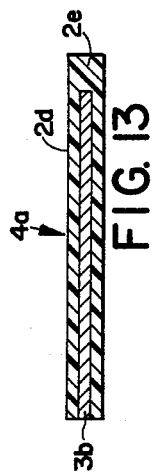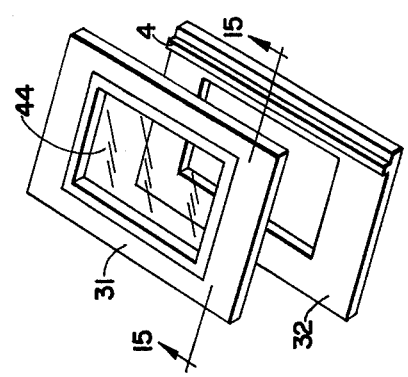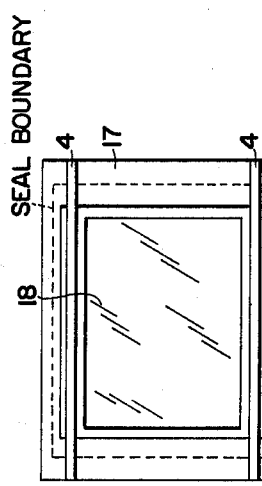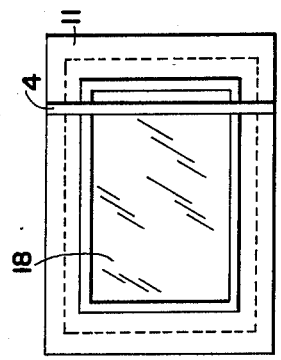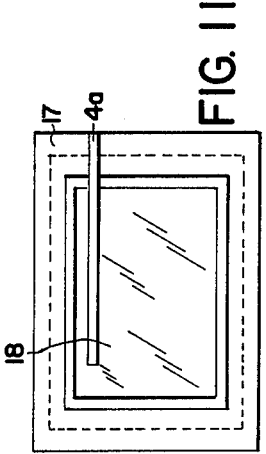

VENTED FLAT BATTERY

BACKGROUND OF THE INVENTION

This invention relates to a thin, flat electrical cell and battery construction, and more particularly to novel apparatus for venting such cells and batteries.

Presently flat multicell batteries are utilized as power supplies to actuate motor-driven film processing means and optical adjustment apparatus including shutter control apparatus in automated cameras adapted to effect sequential exposure and development of photographic film. Representative of such cameras are those described, for example, in U.S. Pat. Nos. 3,750,551, 3,744,385, 3,731,608, and 3,714,879. For such a photographic application, the battery should be thin and compact and should have a relatively low impedance to produce a high output current over a time period corresponding to a reliable shelf life.

Batteries of the kind described are composed of cells having a plurality of thin, flat layers including a positive electrode, a negative electrode and an electrolyte-containing layer, which layer itself can comprise one or more layers. In multicell batteries, the cells are separated by an electrically conductive layer such as a conductive plastic material, which functions also to prevent electrolyte migration between cells. The electrically conductive layer is positioned between adjacent cells to contact the negative electrode of one cell and the positive electrode of the next adjacent cell. The periphery of the battery construction is sealed to minimize water vapor loss from the cells and to minimize contamination of the cell by gases, particularly oxygen, in the ambient atmosphere.

A major problem associated with these batteries is that the materials comprising the electrolyte cause formation of hydrogen-rich gas within the battery. If the gas pressure within the battery is not controlled, the battery will expand and the layers within the battery become separated, thereby seriously reducing electrical conductivity between the cells and the current output of the battery. In addition, gas formation increases the battery thickness so that it cannot be used in the camera for which it is designed. Furthermore, the increased gas pressure reduces the integrity of the battery seals, thus rendering the battery inoperative within a short time.

A variety of battery venting means presently are available for selectively removing gas produced in the battery while preventing liquid water removal therefrom and while preventing invasion of the outside atmosphere into the battery.

U.S. Pat. No. 3,870,566 discloses a venting system for a thin, flat battery comprising at least one solid or hollow fiber formed of a material pervious to the gas produced in the battery. The interior of the hollow fibers communicate with the atmosphere, and the fibers are positioned adjacent a liquid impervious, hydrogen gas-pervious plastic layer which separates the hollow fibers from contact with either the electrodes or the electrolyte.

U.S. Pat. No. 3,647,557 discloses a battery which includes a hollow fiber formed from a liquid-impermeable plastic material that is pervious to the gas produced in the battery. The fiber extends through the battery wall into the battery interior either in contact with the liquid electrolyte or into the space above the electrolyte. The exterior of the fiber wall is sealed at the points where it extends through the battery wall and is formed so that its interior does not communicate directly with the battery interior.

U.S. Pat. No. 3,741,813 describes a battery which includes a nonconductive, gas-pervious, liquid-impervious outer wall to house the electrodes and the electrolyte. A conductive liquid-impervious, gas-pervious membrane is positioned adjacent the wall and is sealed around the perimeter of a hole in the wall. The membrane has at least one hole that communicates the wall to the battery interior. The hole in the wall is offset from the membrane holes to expose the conductive membrane to the atmosphere.

U.S. Pat. No. 3,741,812 shows a battery construction similar to that shown in U.S. Pat. No. 3,741,813 except that the outer wall is electrically conductive and contains a hole while the membrane sealed to the hole and located between the outer wall and the battery interior is nonconductive and does not contain a hole. In the batteries disclosed in these patents, the holes and the gas-pervious walls and membranes prevent gas build-up within the battery and permit the introduction of oxygen into the battery where the positive electrode comprises an oxidizing agent.

U.S. Pat. No. 2,632,784 discloses a battery vent formed of a flat tape comprising woven fibers backed with a gas-permeable adhesive which is sealed longitudinally to a stack of cells forming the battery wherein at least one end of the tape is open to the atmosphere. U.S. Pat. No. 3,081,371 discloses a venting means for a cell comprising a hole in a wrapping film for the electrodes positioned to minimize electrolyte leakage.

Venting mechanisms such as those described above typically leave something to be desired in one or both of the desired qualities of reproducibility and selectivity. For example, it is very difficult to install a fine hollow tube in a battery without closing or partly closing the tube, leading to underventing, or to overventing if a larger tube is used in cases where it is not closed during assembly. If a plurality of such tubes are used to make sure that at least one is not closed, the problem is exacerbated because the tubes become smaller, and the chances of encountering overventing or underventing are not improved.

The objects of this invention are to improve the reliability and to increase the selectivity of vents for laminar batteries.

Briefly, the above and other objects of the invention are attained by a novel vent construction comprising one or more plastic tubes each containing packing fibers along the length of the hollow interior of the tube. The packing fibers provide mechanical stability to the tube so that emplacement of the tube in the battery can be made without collapsing the tube. The walls of the tube are permeable to hydrogen, and impermeable to liquids. Since the tube is in a noncollapsed state in the battery, and because the gas and water vapor permeability characteristics of the compositions utilized to form the tube can be predicted with accuracy, the battery venting system of the invention provides a significant improvement over prior art battery venting systems. Specifically greatly increased control is provided in balancing the transport of the gases generated in the battery, the outside atmosphere, and water vapor, through the venting system in a manner so that battery life can be greatly extended. In addition, a venting system in accordance with the invention provides excellent selectivity without critical demands on the materials employed in the vents. In particular, the walls of a fiber packed tube used as a vent serve as the primary diffusion impedance to the diffusion of hydrogen, whereas the elongated passage through the tube around the packing fibers serves as an additional impedance to the diffusion of water vapor. Both the walls of the hollow tube and the elongated passage through it are significant oxygen diffusion barriers, although the tube wall is presumably the limiting impedance to oxygen flow. Thus, the material for the hollow tube, and its area and thickness can be selected primarily on the basis of hydrogen permeability and its ability to participate in the battery seals, without great concern for permeability to water vapor. For example, polyvinyl chloride, while relatively permeable to water vapor, is well suited to the practice of the invention.

The fiber-filled tube is positioned in the battery so that the gases generated in the battery pass through the walls of the tube either directly or indirectly by being passed first through a gas permeable, liquid impermeable layer in the battery and then through the tube wall. When the tube terminates in a wet region of the battery, the end of the tube within the battery is closed to prevent direct communication of the fiber packed interior of the tube with the interior of the battery. In any event, at least one end of the fiber-filled tube is open to the atmosphere exterior of the battery. The packed tube can be positioned so that it extends across a portion of or over the entire battery width or length.

In the drawings;

FIGS. 9, 10 and 11 are schematic plan sketches showing alternate placements of vents in batteries;

FIG. 12 is a schematic perspective sketch of a laminated paper and plastic strip useful in making a vent for use in the structure depicted in FIG. 11;

FIG. 13 is a schematic elevational cross-sectional sketch of a finished tube vent made from the strip of FIG. 12, as taken generally along the lines 13—13 in FIG. 12;

FIG. 14 is a schematic exploded sketch of a frame, separator and vent construction in accordance with another embodiment of the invention;

The essential elements of a battery vent suited for the practice of the invention are a tube of liquid impermeable, gas pervious material filled with fibers to create a gas diffusion passage within the tube of fixed dimensions. The finished structure should be free from pinholes in the tube, and the tube must be open at least at one end. Various methods have been proposed for the manufacture of this structure, but the presently preferred method, as giving high yields, is that shown and described in copending Application for Letters Patent Ser. No. 761,653, filed concurrently herewith by Alfredo G. Kniazzeh for Method and Apparatus for Manufacturing Battery Vents and Vented Batteries. The method, more fully described therein, will be briefly described herewith reference to FIGS. 1 through 4.

Figure 1:
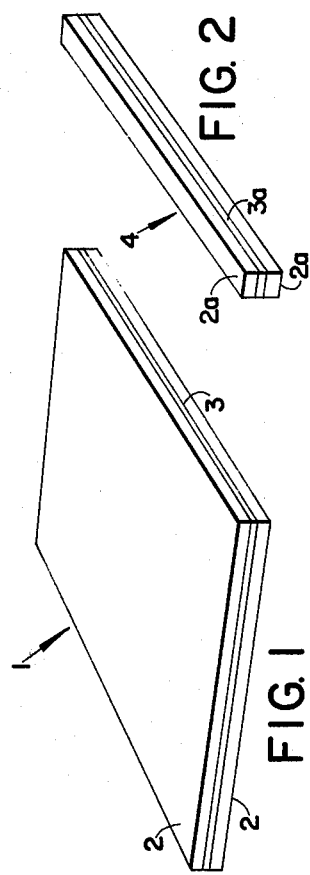
FIG. 1 is a schematic perspective sketch of a plastic-paper laminate useful as the starting material of the manufacture of a vent in accordance with the invention.

Referring first to FIG. 1, vent stock is made up in the form of a sheet 1, comprising a laminate of two thermoplastic sheets 2 on either side of a sheet of paper 3. The plastic sheets 2 may be of any suitable thermoplastic resin compatible with the battery chemistry, impervious to liquid and having a suitable permeability to gases. Saran, various polyamides, polyvinyl chloride and the like may be mentioned as suitable materials; in the illustrative embodiment to be described, the sheets 2 were made of polyvinyl chloride, 10 mils in thickness. The paper is not especially critical. Plain white bond paper, 4 mils in thickness has been found quite satisfactory. Other papers such as insulating papers, wrapping papers and the like, of suitable thickness, from 3 to 6 mils may be employed. Sizings and clay fillers serve no useful purpose and should be omitted.

The quality of the bond between the plastic sheets 2 and the paper 3 in the initial laminate 1 is not critical either; it can be accomplished by the application of moderate heat and pressure in a conventional fashion. The primary consideration is that the plastic should not be melted sufficiently to fill the paper. It is simply necessary to provide an adequate bond to hold the laminate together during subsequent processing.

Figure 2:
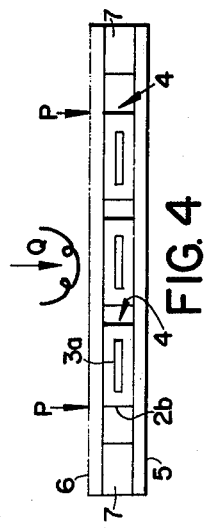
FIG. 2 is a schematic perspective sketch of a strip cut from the laminate of FIG. 1 as a step in the manufacture of a vent in accordance with the invention.

The laminate 1 is cut into strips 4 as shown in FIG. 2. Each of the strips 4 comprise a laminate of strips 2a of plastic with an intermediate strip 3a of paper. The strips 4 are formed into vent tubes in the manner illustrated in FIGS. 3 and 4.

Figure 3:
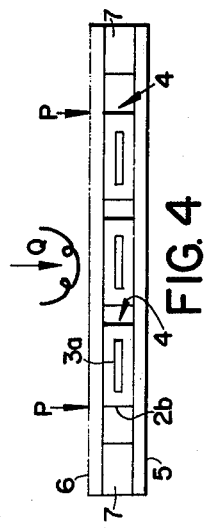
FIG. 3 is a schematic elevational sketch of a press used in the formation of vents in accordance with the invention, showing three strips such as those of FIG. 2 in end view as along the lines 3—3 of FIG. 2.

FIG. 3 shows a conventional press comprising a fixed lower platen 5, and a moveable upper platen 6 between which a number of the strips 4 are placed. Shims 7, which in the embodiment to be described may comprise steel shims 0.012 inches in thickness, are placed in the press to limit the travel of the platen 6 towards the platen 5.

Figure 4:
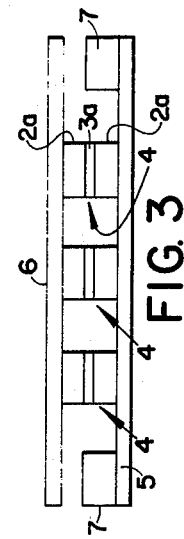
FIG. 4 is a schematic elevational sketch similar to FIG. 3 but showing the press in closed position with heat applied.

As suggested in FIG. 4, heat and pressure is applied between the platens 5 and 6 to form the outer plastic strips 2a into a coalescent sheet 2b around the paper strips 3a. The tubes 4 so formed are then removed from the press and cut into strips of the desired length.

Figure 5:
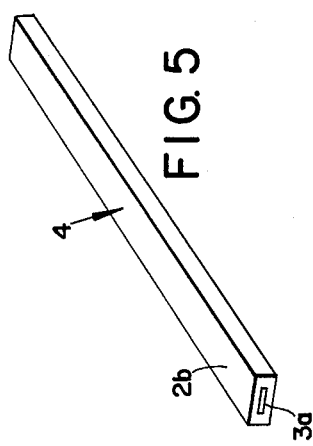
FIG. 5 is a schematic perspective sketch of a finished vent in accordance with the invention.

In the forming process, the ends of the tubes will usually be closed with plastic, but when the strips are cut as shown in FIG. 5, at least one end will have the paper strip 3a exposed. Strips thus formed have polyvinyl chloride walls about 4 mils in thickness on either side of the 4 mil plastic strip 3a. For purposes of the specific embodiment to be described, the paper strips 3a were made about one sixteenth inch in width, and the finished tubes, as in FIG. 5, were about one eighth inch in width. The length of the finished tube vents, as shown in FIG. 5, are determined by the manner in which they are installed in a battery, to be described below.

Figure 6:
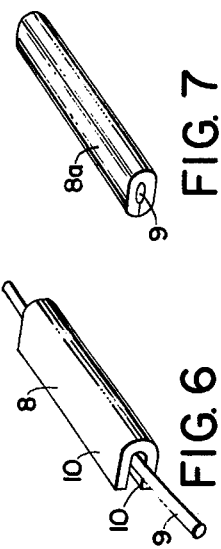
FIG. 6 is a schematic perspective sketch illustrating another method of forming a vent in accordance with the invention.
Figure 7:
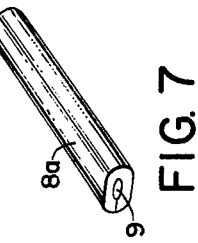
FIG. 7 is a schematic perspective sketch of a vent made from the components of FIG. 6 in a manner to be described in connection with FIG. 6.

Another method of forming tube vents is illustrated in connection with FIGS. 6 and 7. As shown in FIG. 6, a strip of thermoplastic material 8, such as polyvinyl chloride or the like, which is approximately one eighth inch in width, is folded in half, and a fine cotton thread 9 is inserted into the bight of the folded strip 8. Heat and pressure are then applied as described above, to seal the edges 10 of the strip 8 together to form a closed tube 8a of desired length around the thread 9. Conventional cotton thread, such as JP Coates No. 30 white thread or the like, is suitable for the purpose. Other spun or twisted fibers may be employed, the only considerations being that the fibers do not melt at the temperatures required to seal the tube 8a.

Figure 8:
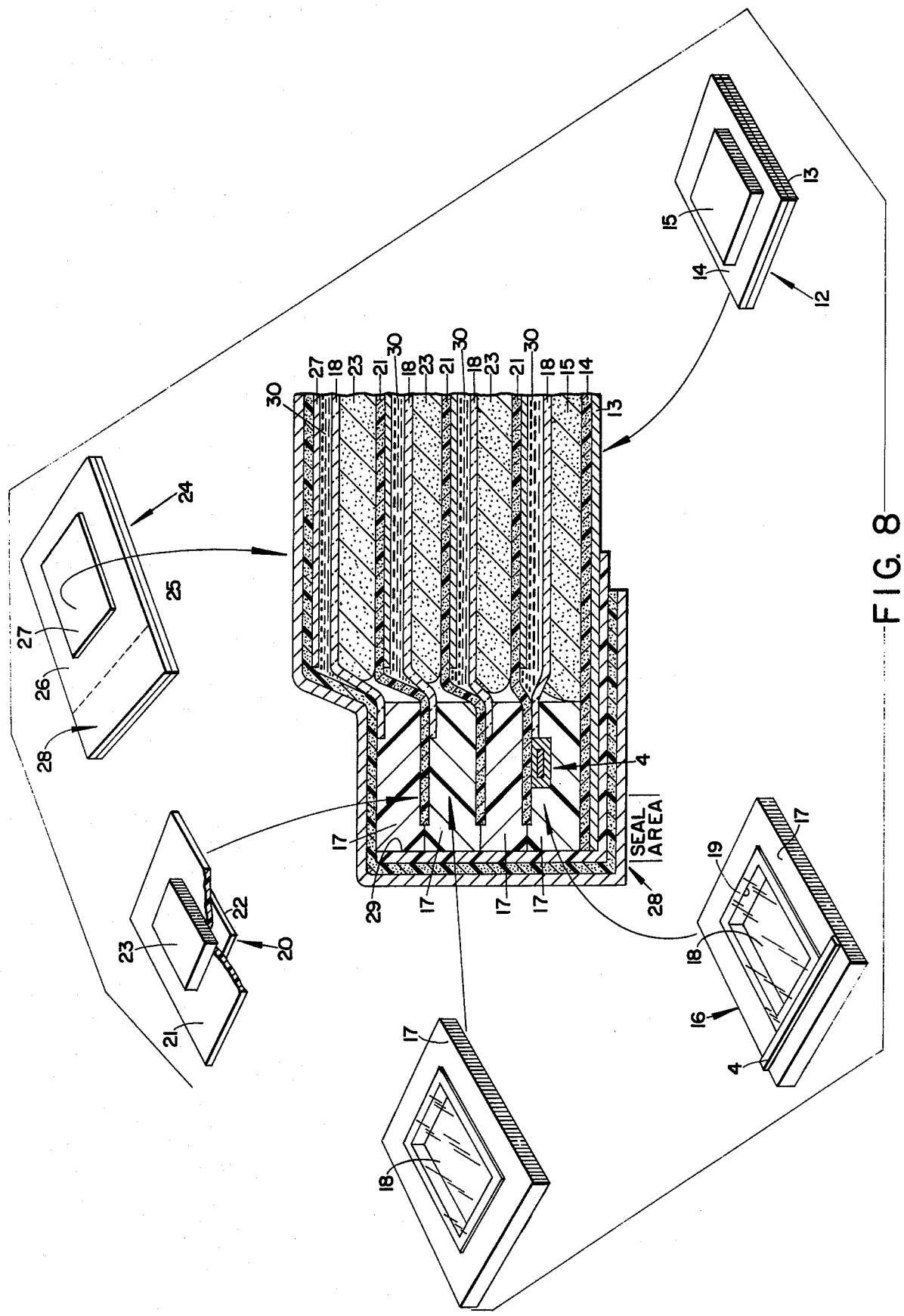
FIG. 8 is a composite schematic sketch illustrating components of a vented battery in association with a fragmentary elevational cross-sectional sketch of a battery made from the components, on an enlarged scale, to show the sequence of assembly of the components in manufacturing a battery in accordance with one embodiment of the invention.

FIG. 8 illustrates the manner in which a four-cell vented battery in accordance with the invention is assembled. The basic battery construction may be of any conventional variety, but in the embodiment to be described, it is of the kind more fully described in copending abandoned U.S. Application for Letters Patent Ser. No. 684,370, filed on May 7, 1976 by Edwin H. Land for Electrical Cells and Batteries and assigned to the assignee of this application.

As indicated in FIG. 8, the battery comprises a cathode terminal assembly generally designated 12. The cathode terminal assembly 12 includes a tinned steel terminal sheet 13. In the illustrative embodiment to be described, the sheet 13 comprises a sheet of tinned steel 2 mils in thickness and 3.42 by 2.75 inches in lateral dimensions.

To the steel sheet terminal sheet 13 is laminated, in a conventional manner, a conductive plastic collector sheet 14, comprising a thermoplastic resin filled with carbon black to make it conductive. A suitable material for this purpose is a carbon filled vinyl resin sold under the trademark Condulon by Pervel Industries, Inc. In the illustrated embodiment, the sheet 14 is 2 mils in thickness and of the same lateral dimensions as the terminal sheet 13. On the surface of the collector sheet 14 is deposited, by extrusion, for example, a cathode path 15 of the composition described in the above cited application Ser. No. 684,370. This layer is deposited over an area of about 2½ by 1⅞ inches to a weight of 3.5 grams.

Over the cathode terminal assembly 12 just described is placed a vented frame and separator assembly 16, comprising a frame 17 having outer dimensions corresponding to the dimensions of the cathode terminal assembly 12 and formed with a generally rectangular central aperture 19 adapted to receive the cathode patch 15. The frame 17 may be made of any suitable liquid impervious material, and polyvinyl chloride frames 5 mils in thickness have been employed with good results. The presently preferred material is Versalon 1140, a hot melt polyamide resin, as made and sold by General Mills Corp. of Minneapolis, Minn. Over the frame 17 is placed a cellophane separator 18, of dimensions somewhat larger than the aperture 19, but within the border of the frame 17 that will be sealed in a manner to be described. Across the frame 17 is placed one of the vents 4, made by the methods described above. The separator 18 and vent 4 may be temporarily heat sealed to the frame 17 to facilitate assembly.

Three electrodes and intercell connector assemblies 20 are incorporated in the battery. These each comprise a sheet of conductive plastic 21, which may be 2 mils in thickness and may be made of the carbon-filled vinyl resin described above. The lateral dimensions of the sheets 21 are slightly smaller than those of the frames 17, so that the frames will extend beyond the borders of the intercell connectors in the finished assembly.

On one side of the sheet 21 is deposited a dry patch anode 22 of the construction described in the above cited application Ser. No. 684,370. This patch 22 is initially laid down by extrusion as a slurry, which is then dried. Next, a cathode deposit 23, which may be the same as the deposit 15 described above, is extruded onto the sheet 21.

A coat of gel electrolyte 30 is then spread onto the dry patch surface 22 of the anode assembly to a depth of about 5 mils. The intercell connector and electrode assembly 20 is then put in place over the vented frame and separator assembly 16, as shown in FIG. 8.

Next, another frame 17 and attached separator 18 is put in place over the duplex electrode structure just described. The process continues in this fashion until two more intercell connector and electrode assemblies 20, and the remaining two frames 17 and separators 18, have been installed as shown in FIG. 8.

An anode terminal assembly 24 is now put in place. The anode assembly 24 comprises an outer steel terminal plate 25. The plate 25 may be of tinned steel 2 mils in thickness. An anode collector terminal sheet 26 of 2 mil conductive plastic is laminated to the sheet 25 as described above.

On the collector sheet 26 is placed a zinc anode patch 27, which may be the same as the patches 22 described above. As indicated, the anode terminal assembly steel 25 and collector 26 are elongated, as shown in the region beyond the dotted line at 28 in FIG. 8, to form an anode flap. This flap will be folded down into the position shown in FIG. 8, when the assembly is completed, to bring the anode terminal down to the same side of the battery as the cathode terminal.

Prior to putting the anode terminal assembly 24 into position, the anode patch 22 is coated with a layer of gel electrolyte 30 in the same manner as for the duplex electrodes.

The battery, assembled as just described, is sealed entirely around its periphery by heat and pressure applied to the region indicated by the label "Seal Area" in FIG. 8. This is beyond the region in which the vent tube 4 is located, over most of its length, although the vent tube 4 extends through and participates in the seal area near its ends.

In the sealing of the battery, it is important to keep at least one end of the tube 4 open, so that the paper strip 3a is exposed to the atmosphere. During final assembly, the end flap 28 is insulated from the other components of the battery by an intermediate terminal insulating spacer sheet 29, of polyvinyl chloride, polyethylene or the like, and the terminal end 28 is folded around, as shown in FIG. 8. Batteries vented in the manner just described have been found to exhibit significantly smaller increases in thickness over extended shelf periods, and to lose very little in closed circuit voltage, relative to unvented batteries made in the same way.

FIG. 9 illustrates three possible variations in the installation of the vent structure. First, the vents such as 4 may be laid longitudinally rather than laterally across the battery, and within instead of outside of the confines of the separator 18. It may be desirable to employ a pair of vents 4 as shown in FIG. 9, rather than a single vent, so that the assembly will be entirely symmetrical, and a symmetrical pressure distribution across the battery during sealing will be encountered. A significant point is that the vents 4 extend within the area of the peripheral seal as indicated by the dotted line, but in each instance, pass through the sealed area to at least one open end outside the battery.

As indicated in FIG. 10, the vent 4 may be arranged to pass within the wet electrochemically active region of the batteries, as long as the vent tube is unbroken and the ends are carried out through the seals as indicated. This construction may be preferred where minimum total battery area is a criterion, as it permits the seal area to be closer to the active area. On the other hand, some interference with electrode function may be expected.

As indicated in FIG. 11, a vent 4a may be installed so that one end is in the electrochemically active area of the battery. For this purpose, the vent 4a must definitely have the end inside the electrochemically active area sealed. As indicated above, at least one end of the vent tube formed as described above is generally sealed during initial forming. However, a seal can be insured by allowing the paper sheet 3b to be shorter than the plastic strips 2c to which it is laminated, so that in the finished vent structure, there will be a definitely sealed end 2e on the finished vent tube 2d.

FIG. 14 illustrates a modification of the invention that is particularly suited for use with the above mentioned Versalon 1140 resin as the frame material. In this instance, the frame in which the vent is installed comprises two identical frames 31 and 32, each approximately half the thickness of a desired finished frame. For example, these frames 31 and 32 may be made of Versalon 1140, 10 mils in thickness. On one of the frames 32 is deposited a vent strip 4 made as described above. A cellophane separator 44 is temporarily heat-tacked to the upper frame 31 as shown.

Figure 15:
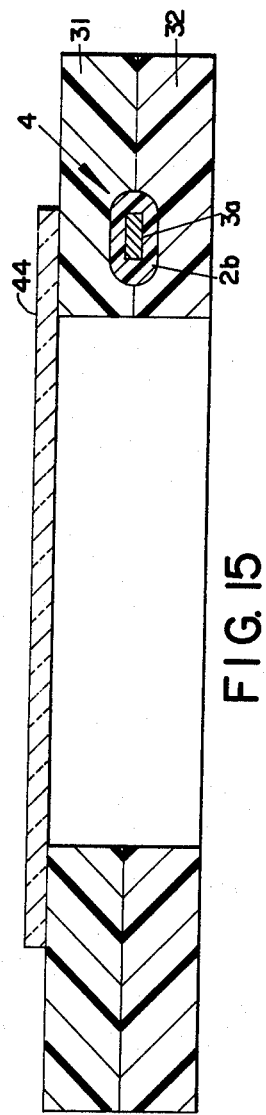
FIG. 15 is a schematic elevational cross-sectional sketch of an assembled vented frame and separator assembly formed from the components of FIG. 14, taken along the lines 15—15 in FIG. 14 but with the parts assembled.

Referring to FIG. 15, the elements just described are heat sealed together to form a composite structure in which the vent tube 4 is bonded to the frame. This bond need not be a particularly good one, as the important thing is that the bond be tight around the edges of the battery. Versalon polyamide material has a rather considerable permeability to gases, so that burying the vent in the frame in this way does not impede the operation of the vent, and yet makes a more compact structure. If desired, the construction may be facilitated by placing the vent tube 4 in a groove suitably formed in the frame 32 to receive it.

Figure 16:
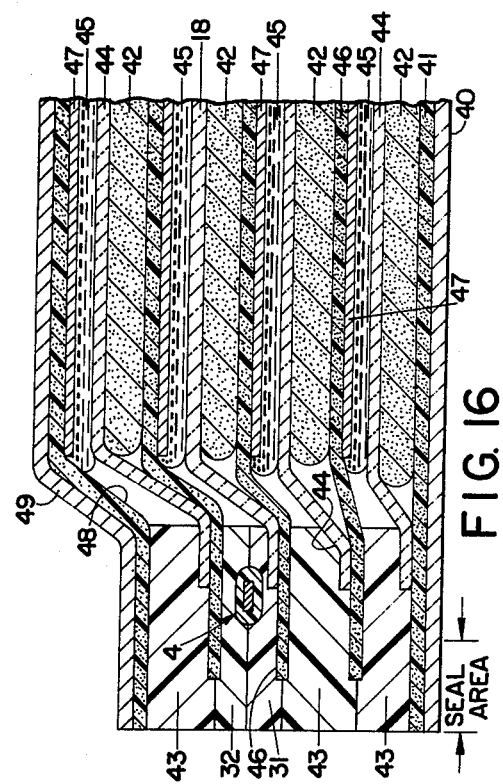
FIG. 16 is a fragmentary schematic cross-sectional sketch of an assembled vented battery incorporating the vented frame and separator assembly of FIGS. 14 and 15.

FIG. 16 shows a battery similar to that of FIG. 8, but which has been assembled in a different sequence and in which the frame elements described in connection with FIGS. 14 and 15 are included. The battery of FIG. 16 may be the same as that described in connection with FIG. 8, with exceptions to be noted.

In particular, the battery of FIG. 16 is built up upon a 2 mil steel 40 to which there is a pre-laminated sheet 41 of 2 mil conductive plastic. A cathode patch 42 is laid down on the cathode terminal assembly as before.

A first frame 43, on which there is pre-tacked a cellophane separator 44 as described above, is put in place, in this case with the separator down on top of the cathode slurry 42. Gel electrolyte 45 is now coated on the outer surface of the separator 44.

Next, an intercell connector and electrode assembly is installed. The assembly comprises a 2 mil conductive plastic intercell connector 46. On the lower side of the intercell connector 46 is a zinc patch 47 as described above. On the upper side of the intercell connector 46 is a cathode patch 42, which may be the same as that on the cathode collector terminal.

Assembly of the battery in this fashion is continued with the addition of a second frame 43 with attached separator 44. Another intercell connector and electrode assembly, comprising an intercell connector 46 with an anode patch 47 and cathode patch 42 is put in place as before.

Next, the vented frame assembly, comprising the frame elements 31 and 32 with the built-in vent tube 4 and separator 44 are put in place, following which the final duplex electrode assembly is put in place. The uppermost frame 43 with its separator 44 are added and coated with gel electrolyte 45. The anode terminal assembly, comprising the conductive plastic collector sheet 48 and tinned steel 49, there being an anode patch 47 on the collector sheet 48 as above, are put on, and the battery is sealed as described above.

While the invention has been described with reference to the particular details of various illustrative embodiments thereof, many changes and variations will occur to those skilled in the art upon reading this description. Such can obviously be made without departing from the scope of the invention.

What is claimed is:

1. In a thin flat laminar battery comprising laminar electrodes, separators and intercell connectors in a gas-permeable central region and means forming a liquid-impermeable seal surrounding said gas-permeable central region, a vent tube extending through said seal into said gas-permeable region, said tube comprising a hydrogen-permeable liquid-impervious tube filled with fiber to form a gas diffusion passage of substantially uniform cross section and having at least one end exposed to the environment outside of said seal and no opening inside said seal.

2. A vented cell, comprising an anode and a cathode disposed on either side of a separator and communicating through an electrolyte permeating said separator, means forming a substantially gas and liquid impermeable seal about said cell, and a vent comprising an elongated tube of liquid-impermeable, hydrogen-pervious material extending through said seal into said cell, said vent further comprising fibers filling said tube to produce a gas diffusion passage of substantially uniform cross section opening only to the environment outside of said seal.

3. The cell of claim 2, in which said tube has one closed end inside of said cell.

4. The cell of claim 2, in which said tube extends through said seal between two ends open to the environment outside of said seal.

5. A thin, flat laminar battery comprising a plurality of cells separated by conductive liquid-impervious, gas-permeable sheets, means forming a seal about said cells between the peripheries of said conductive sheets, and a vent extending between a pair of said conductive sheets and through said seal, said vent comprising an elongated tube of liquid-impermeable, hydrogen-pervious material packed with fibers to form a gas diffusion passage throgh and in the interstices between said fibers of substantially uniform cross section, said tube having at least one end open to the environment outside of said seal and no opening inside of said seal.

* * * * *